United States Patent [19]

Matson, Jr. et al.

[11] 4,114,703
[45] Sep. 19, 1978

[54] WELL DRILLING TOOL HAVING SEALED LUBRICATION SYSTEM

[75] Inventors: Lawrence Wayne Matson, Jr., League City; Jeddy Darr Nixon, Jr.; Larry Joseph Remont, both of Houston, all of Tex.

[73] Assignee: Maurer Engineering Inc., Houston, Tex.

[21] Appl. No.: 849,977

[22] Filed: Nov. 9, 1977

[51] Int. Cl.² .............................................. E21B 1/06
[52] U.S. Cl. ................................. 175/107; 308/187.1; 415/502; 184/1 C; 175/228; 175/237
[58] Field of Search ................................. 175/92–107, 175/39, 40, 227, 228; 308/1 A, 187.1; 415/502, 216, 218; 184/1 C

[56] References Cited

U.S. PATENT DOCUMENTS

| | | | |
|---|---|---|---|
| 2,907,611 | 10/1959 | Robinson | 308/187.1 |
| 3,866,988 | 2/1975 | Striegler | 175/107 X |
| 3,971,450 | 7/1976 | Fox | 175/107 |
| 3,997,009 | 12/1976 | Fox | 175/107 |
| 4,019,591 | 4/1977 | Fox | 175/107 |
| 4,019,592 | 4/1977 | Fox | 175/107 X |

*Primary Examiner*—Ernest R. Purser
*Assistant Examiner*—Richard E. Favreau
*Attorney, Agent, or Firm*—Neal J. Mosely

[57] ABSTRACT

A turbo drill which is connected to a string of drill pipe as a rotating shaft for driving a drill bit which may be a rotary bit or a high speed solid head diamond bit. The turbine section has rotor and stator blades which are crescent shaped in cross section with each blade having an exit angle of 14°– 23° from maximum turbine efficiency. The bearing shaft is provided with chevron rotary seals positioned below the rotary bearings carrying both radial and vertical thrust. Fluid lubricant fills the space from the rotary seals to a predetermined level above the bearings. A piston seals the lubricant chamber and is pressurized by drilling fluid (i.e., mud) flowing through the tool. A layer of lubricant fluid overlies the first piston and has a second piston covering said fluid and transmitting pressure from the drilling fluid to the lubricant fluid surrounding the bearings. A plug member in the bearing shaft is positioned to be dislodged at the low lubricant position of the first piston to provide a temporary obstruction to the flow of drilling fluid to give an indication, at the well surface, of loss of lubricant in the turbo drill. An optional feature provides for increasing the pressure drop of drilling fluid in the turbo drill to cause the vertical thrust to be carried on the bottom vertical thrust bearings, after the top vertical thrust bearings are worn, and thus extend the drilling life substantially. A further optional feature is a locking ring arrangement which prevents separation of threaded connections in the drill housing during use.

10 Claims, 18 Drawing Figures

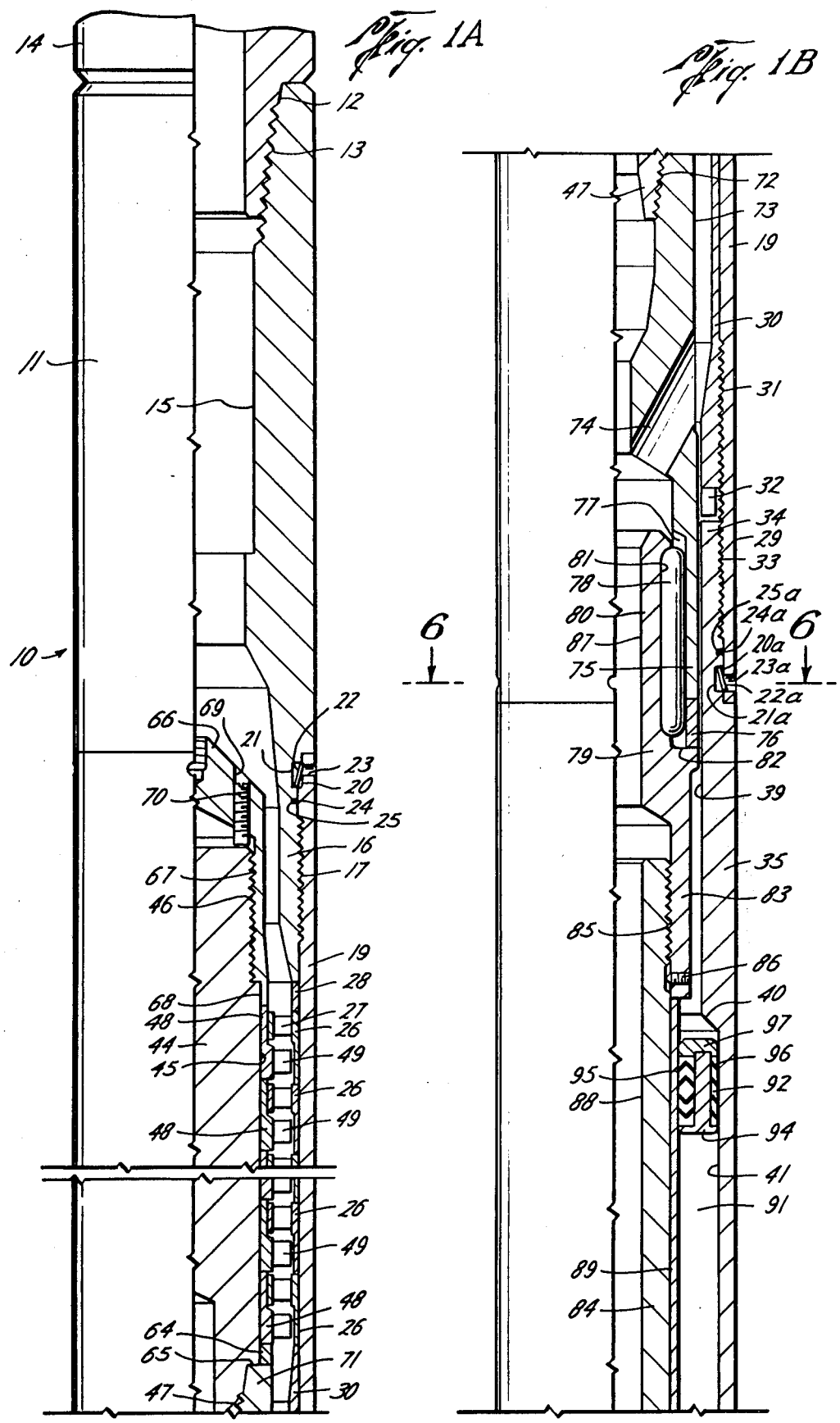

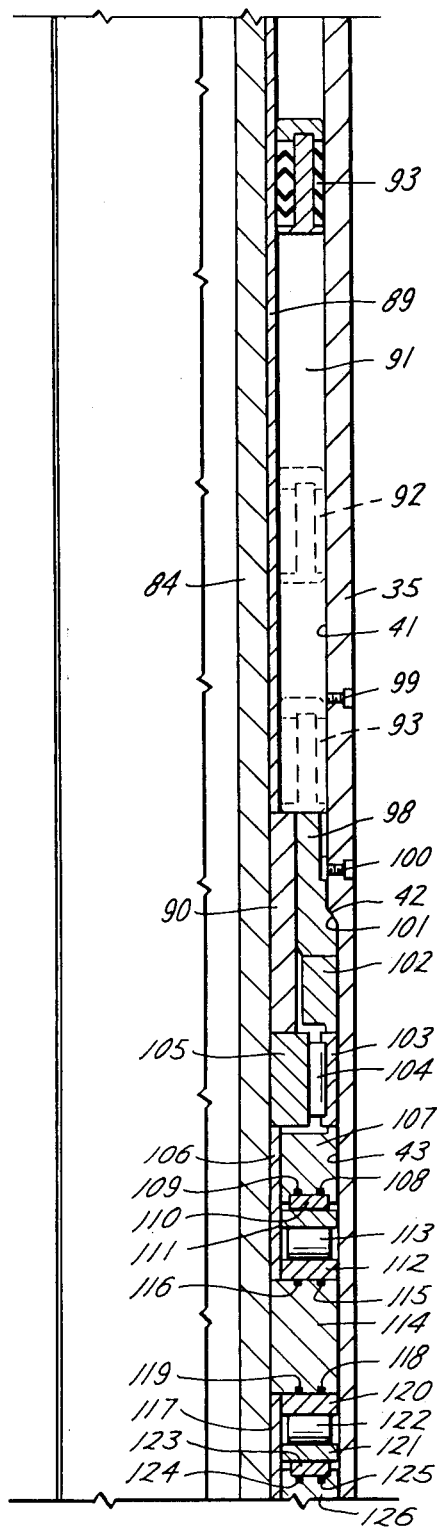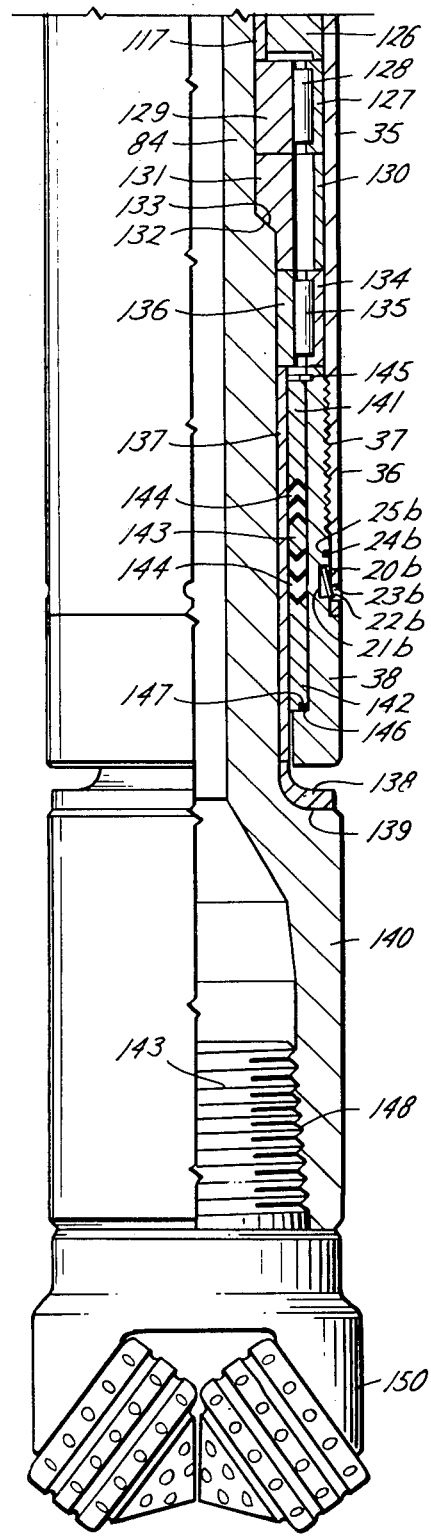

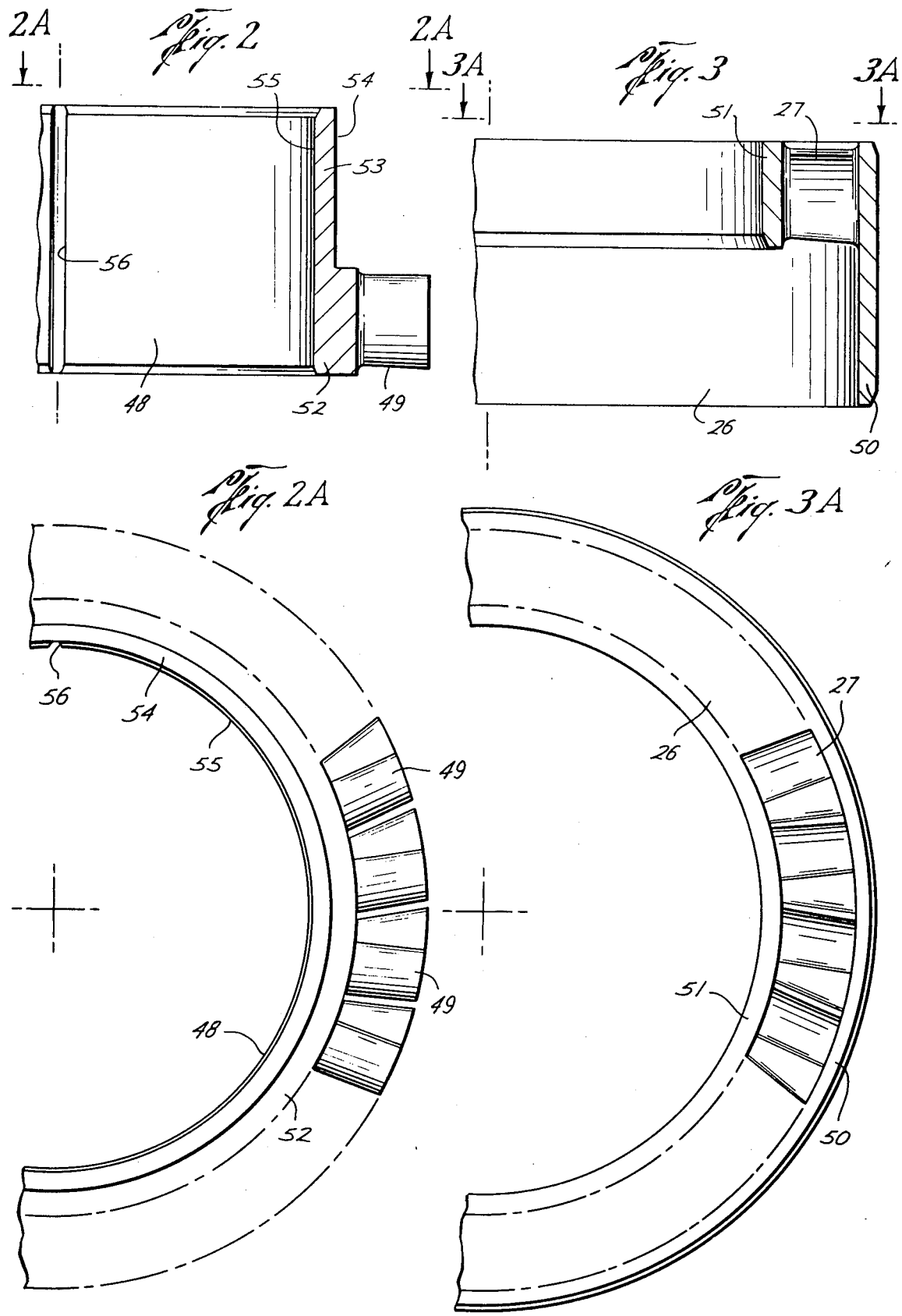

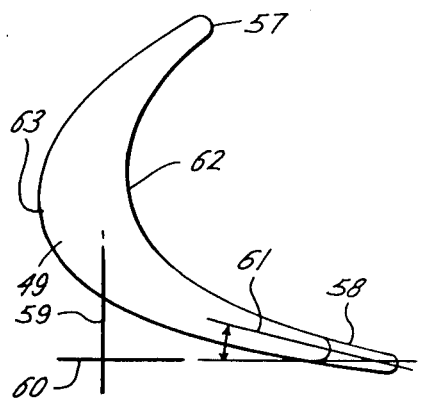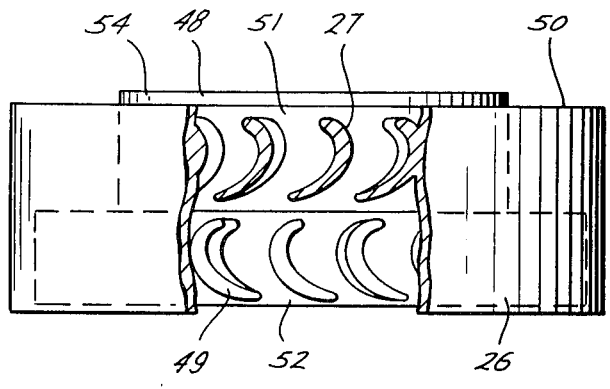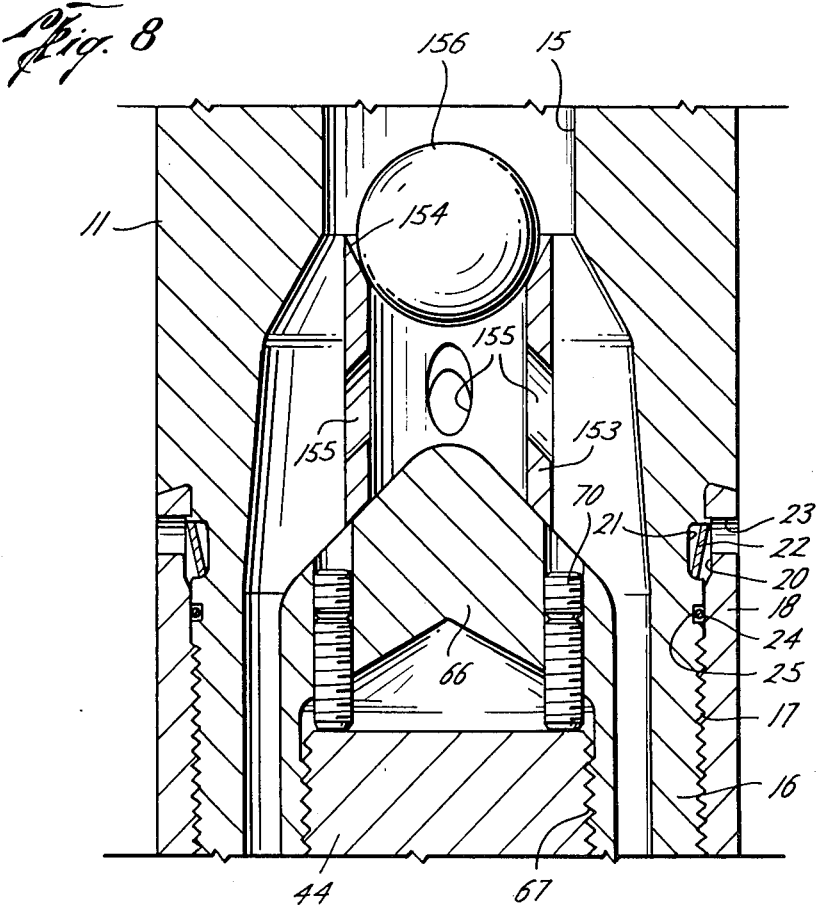

WELL DRILLING TOOL HAVING SEALED LUBRICATION SYSTEM

CROSS-REFERENCE TO RELATED APPLICATIONS

This application is related to commonly assigned applications Ser. Nos. 849,976, 849,978, 849,979 and 849,988 filed on even date herewith, and presents commonly disclosed subject matter.

BACKGROUND OF THE INVENTION

1. Field of the Invention

This invention relates to down hole drilling motors, such as turbo drills and drills operated by positive displacement motors, and to certain improved features therein.

Down hole drilling motors were first invented 100 years ago. Down hole drilling motors were first extensively tested in the 1920's. They did not find wide spread use until the 1950's when turbo drills began to be used in the Soviet Union. By the early 1960's, it is estimated that 85% of the wells in the Soviet Union were being drilled with turbo drills. Down hole drilling motors have found wide spread use in the U.S. for drilling directional holes, but they are not widely used for straight hole drilling because of bearing and seal problems. Commercial down hole drilling motors operate at speeds ranging from 300 to 1,000 rpm whereas, roller bits operate most effectively at speeds of 50 to 150 rpm. At high motor speeds, roller bearings fail after periods of about 5 to 15 hours whereas with conventional drilling equipment operating at lower speeds the bearings of roller bits last up to 200 hours. Down hole motors have had substantial problems in design of radial and vertical thrust bearings, lubrication systems, turbine efficiency, housing construction, etc., which have limited substantially the acceptability of down hole motors in petroleum drilling and in other applications.

2. Brief Description of the Prior Art

Down hole drilling motors were patented soon after the aduent of rotary drilling rigs in the 1860's. Cross U.S. Pat. No. 174,922 discloses a very primitive turbo drill. Baker U.S. Pat. No. 292,888 discloses a single stage axial flow turbo drill which is similar in some respects to modern turbo drills. Scharpenberg U.S. Pat. No. 1,482,702 discloses one of the earliest multi-stage turbo drills which was the forerunner of turbo drills currently in use. The Scharpenberg turbo drill contained a lubrication system which allowed the thrust bearing to operate in oil or grease. Drilling fluid acting on a floating piston pressurized the lubricant in the system. The bearings in modern turbo drills operate directly in the abrasive drilling mud, resulting in rapid failures, which limit the application of these drills.

Capeliuschnicoff U.S. Pat. No. 1,681,094 discloses a single staged geared turbo drill. These turbo drills were tested extensively in the Soviet Union from 1924 to 1934. The Russians had severe problems with the speed reducers Capeliuschnicoff turbo drill and subsequently changed to the Scharpenberg turbo drill. Several Russian engineers perfected multi-stage turbo drills during the 1940's and 1950's and by the early 1960's, the Russians were drilling 80 to 90% of their wells with axial flow turbo drills. The Russians licensed turbo drill technology to companies in the U.S., France, Germany and Austria. Turbo drills have had a rather limited commercial acceptance and are used primarily in directional wells.

Virtually all down hole drilling motors have four basic components;
1. Motor section
2. Vertical thrust bearings
3. Radial bearings
4. Rotary seal.

The bearings and seals can be placed in a separate package or unit at the motor section and thus can be used on any type of motor (i.e. turbo drills, positive displacement motors, etc.).

There are two basic types of down hole drilling motors:
1. Turbo drills
2. Positive displacement Turbo drills utilize the momentum change of drilling fluid (i.e. mud) passing through the curved turbine blades to provide torque to turn the bit. Diamond bits are used on most turbo drills because these motors turn at speeds of 600 to 1,000 rpm whereas roller-type rock bits operate effectively only at speeds up to about 150 rpm. Positive displacement motors have fixed volumetric displacement and their speed is directly proportional to the flow rate. There are three basic types of positive displacement motors in use or currently under development:
1. Moineau motor
2. Flexing vane motor
3. Sliding vane motor These motors have large volumetric displacement and therefore deliver higher torques at lower speeds.

Thrust bearing failures in down hole motors is a problem because of high dynamic loads produced by the action of the bits and by drill string vibrations. One major oil company placed a recorder at the hole bottom and found that dynamic loads were often 50% higher than the applied bit weight. It was found on occasion that the bit bounced off bottom and produced loads in excess of 120,000 pounds when drilling at an applied bit weight of 40,000 pounds. These high loads can cause rapid failure of the thrust bearings; consequently these bearings must be greatly over designed to operate in the hostile down hole environment.

Two types of bearings have been used in down hole drilling motors:
1. Rubber friction bearings
2. Ball or roller bearings In existing motors, these bearings operate directly in the abrasive drilling mud and usually wear out in 20 to 100 hours. In addition, the rubber friction bearings have high friction and therefore absorb 30 to 40% of the output torque of the turbo drills. The lift of the vertical thrust bearings can be increased by operating at bit weights which nearly balance the hydraulic down thrust thereby removing most of the load from these bearings.

Radial bearings are required on each side of drilling motors and on each side of the vertical thrust bearings. These radial bearings are usually subjected to lower loads than the thrust bearings and therefore have much longer life. Two basic types of radial bearings are used in down hole motors:
1. Marine bearings
2. Roller or ball bearings Most motors contain marine bearings made of brass, rubber or similar bearing materials. The marine bearings are cooled by circulated mud through them.

Rotary seals are currently the weakest link in down hole motor design. Improved seals would allow the bearings to be sealed in lubricant, thereby increasing their life substantially. Improved seals would allow bits to be operated at higher pressures thereby greatly increasing drilling rate.

There are six basic types of seals that have been tested in down hole motors:
1. Packing seals
2. Face seals
3. Labyrinth seals
4. Radial lip seals
5. Constrictions (friction bearings and marine bearings)
6. Flow metering seals Existing drilling motors allow drilling mud to continuously leak through the rotary seals by constricting the flow with any of a variety of seals permitting leakage. Sand and other abrasive particles are filtered out of the mud in the rotary seals which results in rapid failure of the seals. Any substantial improvement in turbo drill design will require positive seals which allow no appreciable leakage.

SUMMARY OF THE INVENTION

A down hole drilling tool is adapted for connection at one end to the lower end of a drill string and at the other end to a drill bit to be driven thereby. The drilling tool includes a tubular housing and rotary shaft supported therein extending therefrom for supporting a drill bit. A suitable motor means, such as a turbine or positive displacement motor, is provided in the housing for actuation by flow of drilling fluid there through for rotating the shaft. Bearings are provided in the housing supporting the rotary shaft and having a rotary lubricant seal. Lubricant fills the space around the shaft from the rotary seal to a predetermined level above the bearings. A piston is provided sealing the space between the shaft and the housing at the upper level of the lubricant fluid and moveable longitudinally of the housing. A rotary seal is positioned above the piston to prevent contact of said piston by the drilling fluid flowing through the tool and hydraulic means is provided for applying pressure from the drilling fluid to the piston.

BRIEF DESCRIPTION OF THE DRAWINGS

FIG. 1A is a view of the uppermost portion of a turbo drill, partly in elevation and partly in vertical section and further broken vertically to reduce the length of the turbine section;

FIG. 1B is a view partly in elevation and partly in vertical section of the next successive lower portion of the turbo drill and illustrating an improved turbine seal;

FIG. 1C is a view of the next lower portion of the turbo drill partly in elevation and partly in section and illustrating an improved seal and an improved bearing arrangement therein;

FIG. 1D is a view of the turbo drill partly in elevation and partly in vertical section showing the bottommost portion of the drill including the connection from the drill motor to the drill bit;

FIG. 2 is an enlarged view, in vertical section of the one of the turbine rotor rings, showing the turbine blade in elevation;

FIG. 2A is a plan view of the turbine rotor viewed from the line 2A — 2A;

FIG. 3 is an enlarged view, in vertical section, illustrating one of the turbine stator rings;

FIG. 3A is a plan view seen from the line 3A — 3A of the stator ring shown in FIG. 3;

FIG. 4 is a view in end elevation of one of the stator or rotor blades;

FIG. 5 is a view in elevation, and partially broken section, of a sub-assembly of a turbine stator and rotor;

FIG. 8 is an enlarged view in vertical section of the middle portion of FIG. 1A illustrating an optional feature for providing a flow restriction operable to reverse the loading on the thrust bearings of the turbo drill.

DESCRIPTION OF THE PREFERRED EMBODIMENT

Figure 6:
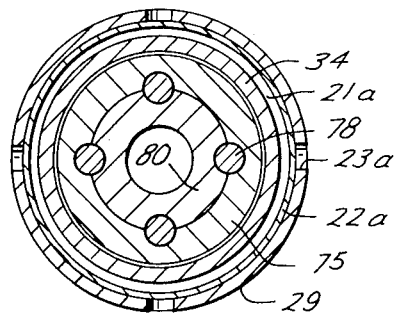
FIG. 6 is a sectional view taken on the line 6 — 6 of FIG. 1B illustrating a locking ring preventing separation of threaded connected portions of the turbo drill housing.

Referring to the drawings by numerals of reference and more particularly to FIGS. 1A to 1D, inclusive, there is shown a turbo drill which is generally designated 10. Turbo drill 10 is very long in relation to its width and requires FIGS. 1A, 1B, 1C and 1D to show its entire structure even though a substantial portion of the turbine section is omitted in FIG. 1A. A typical turbo drill of this design which is 7¾ inches in diameter is about 20.5 feet long. The turbine section represents almost half the length of the turbo drill and it is therefore necessary to omit a large portion of the multi-stage turbine.

At the upper end of turbo drill 10 there is provided a stator housing sub 11 having a threaded box end portion 12 forming a threaded connection 13 with the lower end of a drill string 14. Stator housing sub 11 has an internal longitudinal passage 15 communicating with the open end of drill string 14.

Figure 7:
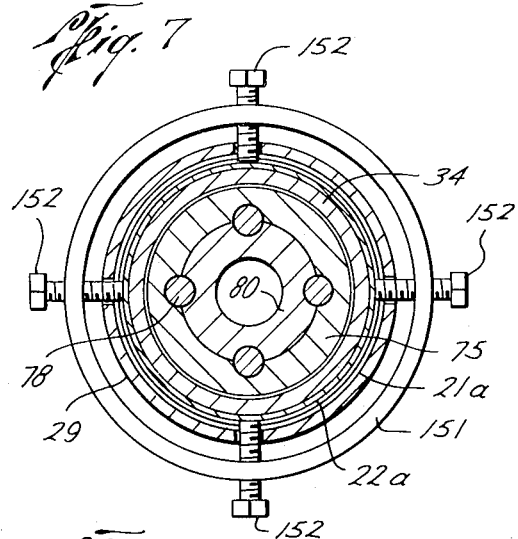
FIG. 7 is a view partially in section, as in FIG. 6, but including a ring-shaped mechanism for release of the locking ring.

Stator housing sub 11 has a threaded pin portion 16 which is threadedly connected as at 17 in the box end portion 18 of the stator housing 19. Stator housing box portion 18 has an internal annular groove 20 therein which mates, when assembled, with an annular groove 21 in the pin portion 16 of stator housing sub 11. A lock ring 22 extends peripherally around the turbo drill in the annular space provided by matching grooves 20 and 21 and abuts the walls of said grooves to prevent disassembly of said stator housing from said stator housing sub accidentally. Stator housing box portion 18 is also provided with a plurality of holes 23 uniformly spaced to provide points for application of pressure to lock ring 22 to permit separation of stator housing 19 from stator housing sub 11. Details of this feature of construction are shown in FIGS. 6 and 7, to be described more fully hereinafter. Threaded connection 17 is sealed against leakage by "O" ring 24 positioned in groove 25.

The turbine section of the turbo drill is positioned in the stator housing 19 just below the threaded joint 17 connecting to the stator housing sub 11. The stator portion of the turbine consists of a plurality of stator members 26 which are shown in more detail in FIGS. 3, 3A, 4 and 5. The stator members 26 are annular in shape and provided with vanes or blades 27 which will be described more fully in connection with the detailed drawings of these parts. Stator members 26 have an exterior surface providing a sliding fit in the inner surface of stator housing 19. Stator members 26 are positioned as a stack of abutting members extending longitudinally within the stator housing 19. In a typical turbo drill having a 7¾ inch diameter, there are 50 of the stator members and 50 of the matching rotor members. The stator members are preferably made of a hard beryllium copper alloy which is wear-resistant and which has a slightly higher coefficient of expansion than the steel of stator housing 19. The stack of stator members 26 is maintained under compression in the stator housing 19 with the result that the members are expanded to fit tightly against the inner surface of stator housing 19 and resist slippage therein. Also, because of the higher thermal coefficient of expansion, the stator members 26 tend to expand more at the high temperatures encountered in use of the turbo drill with the result that the increase in temperature encountered during operation causes stator members 26 to fit more tightly within stator housing 19 and effectively prevents slippage therein.

At the upper end of stator housing 19, there is positioned an annular stator spacer 28 which positions the uppermost stator member 26 relative to the end of stator housing sub 11. At the lower end of stator housing 19 there is a box portion 29 which is internally threaded and receives tubular stator makeup sleeve 30 in a threaded joint 31. The lower end of sleeve 30 is notched as indicated at 32 to receive a wrench for tightening sleeve 30 in threaded joint 31. When stator makeup sleeve 30 is tightened to the position shown, the upper end thereof abuts the lowermost stator member 26 and compresses the entire stack of stator members against each other and against annular stator spacer member 28. Stator makeup sleeve 30 when fully tightened maintains the stack of stator members 26 under sufficient compression to press them tightly against the inner surface of stator housing 19 and prevents slippage of the stator members during operation as described above. The lower box end 29 of stator housing 19 is connected in a threaded joint 33 to the threaded upper pin end 34 of bearing pack housing 35. Just below threaded joint 33, there is provided annular groove 21a in bearing pack housing 35 and annular groove 20a in stator housing 19 and a spring lock ring 22a positioned therein to prevent separation of the members accidentally. The lower end of stator housing 19 is provided with holes 23a providing points for application of pressure to lock ring 22a to permit threaded joint 33 to be separated. An "O" ring 24a positioned in groove 25a prevents leakage of fluid through threaded joint 33.

Bearing pack housing 35 extends from threaded joint 33 at its upper end to a lower box end portion 36 which is internally threaded and has a threaded joint 37 with bearing makeup sub 38. At its extreme upper end, bearing pack housing 35 has an interior diameter defining an inner surface 39 which is an extension or projection of the inner surface of stator makeup sleeve 30. A short distance below the upper end of bearing pack 35, the interior diameter thereof is enlarged at beveled surface 40 to surface 41 defining a lubricant chamber which will be subsequently described in more detail. At the lower end of surface 41 defining lubricant chamber, there is a bevel or shoulder 42 opening into a still further enlarged portion having inner surface 43 enclosing the various radial and thrust bearings. Surface 43 terminates in the the interior threaded portion at the lower box end 36 of the bearing pack housing.

At the upper end of the turbo drill, inside stator housing 19, there is positioned rotor shaft 44 which has a generally cylindrical exterior surface 45 terminating at the upper end in threaded portion 46 and at the lower end in threaded portion 47. Rotor shaft 44 has a plurality of rotor members 48 stacked thereon in abutting relationship and blades or vanes 49 vertically aligned with the stator vanes 27.

Reference is now made to FIGS. 2 to 5, inclusive, which illustrate the construction and relationship of the stator and rotor members in more detail. In FIG. 3, it is seen that stator member 26 comprises an outer sleeve 50 and inner sleeve 51 with vanes or blade members 27 positioned there between and uniformly spaced around the periphery thereof. The outer surface of outer sleeve 50 abuts the inner surface of stator housing 19 securely to prevent slippage of the stator member relative to the housing. The inner surface of inner sleeve 51 is a smooth bearing surface in which rotor members 48 are guided for smooth rotary motion.

Rotor members 48 comprise hub portion 52 from which blade or vane members 49 extend and sleeve portion 53. The exterior surface 54 of sleeve portion 53 is a smooth bearing surface which fits the inner bearing surface of inner sleeve 51 of stator member 26. The inner surface 55 of sleeve 54 and hub 52 is a smooth surface and is provided with groove or key way 56 for securing rotor members 48 non-rotatably on rotor shaft 44. In FIGS. 4 and 5 there are shown detail end views of the blade or vane members 49 and 27, respectively. The blade or vane members are generally cresent-shaped. In FIG. 4 vane or blade member 49 is shown in substantially enlarged detail. Vein member 49 has an upper end 57 which is the inlet end of the vane for receiving fluid (i.e. mud) and the lower end 58 which is the outlet or exit end for discharge of fluid from the blade or vane. The shape of the blades or vanes is critical in the design of this turbo drill. In particular, the exit angle of the blade or vane must be in a very narrowly defined range in order to produce a maximum torque of the turbine. In FIG. 4, the line 59 is the center line of the rotor shaft and line 60 is a line normal thereto. The exit angle of the blade or vane 49 is measured as the angle between line 61 and the normal line 60. Line 61 is a tangent to a curve lying on the mid points between the inner curve 62 and outer curve 63 of blade or vane member 49. The angle between lines 60 and 61 must lie within a range from 14° to 23° and an angle of 18°–21° is preferred. At this exit angle for the blade or vane member, the maximum rotary thrust or torque is obtained for the turbine. As noted, FIG. 4 is an enlarged detail view of vane or blade member 49 of rotor 48. The structure of the vane or blade members 27 of stator 26 is the mirror image of vane or blade members 49 in all details.

Rotor members 48 are positioned on rotor shaft 44 in a stacked relation, as shown in FIG. 1A, with vane or blade members 49 aligned vertically with vane or blade members 27 of stator members 26. Rotor members 48 are positioned on shaft 44 with the key ways 56 thereof aligned and aligned with a longitudinally extending groove in rotor shaft 44. A steel wire (not shown) is inserted in the mating grooves of shaft 44 and rotor members 48 to secure the rotor members non-rotatably thereon. The lower end of the stack of rotor members abuts rotor spacer ring 64 which seats against the upper end 65 of splined connecting member to be subsequently described. At the upper end of rotor shaft 44 there is positioned a cap or makeup screw member 66 which is internally threaded at 67 and forms a tight threaded connection with the threaded end portion 46 of rotor shaft 44. When cap member 66 is tightened in position its lower end portion 68 abuts the uppermost rotor member 48 and compresses the stack of rotor members tightly on rotor shaft 44. Cap member 66 is closed at its upper end and has one or more threaded apertures 69 in which there are positioned set screws 70 to secure cap member 66 against loosening during operation.

Upper spline member 71 has an upper end portion 65 abutting rotor spacer ring 64 as previously described. Spline member 71 is internally threaded and forms a threaded connection 72 with the lower end portion 47 of rotor shaft 44. Spline member 71 is hollow and has an exterior surface 73 spaced from the inner surface of stator makeup sleeve 30 to define an annular passageway therebetween Spline member 71 has a plurality of passages 74 opening into the interior thereof for passage of fluid from the turbine section of the turbo drill. The lower end portion 75 of spline member 71 abuts ring-shaped spline spacer 76. Spline member 71 has a plurality of grooves 77 in the lower or box portion 75 thereof which receive spline pins 78. A lower spline member 79 has upper pin portion 80 provided with grooves 81 which receive the other side of spline pins 78. Spline member 79 has a peripheral shoulder 82 which receives the lower end of space member 76. The lower or box end 83 of spline member 79 is internally threaded to receive the upper end of bearing shaft 84 in a fitted connection as indicated at 85. A set screw 86 is provided to prevent loosening of threaded joint 85 during operation. Spline member 79 has interior longitudinal passage 87 which communicates with passage 74 from spline member 71 at one end and with the interior longitudinal passage 88 in bearing shaft 84 at the other end. Spline member 71 and 79 and spline pins 78 provide a splined drive connection between rotor shaft 44 and bearing shaft 84.

Bearing shaft 84 is provided with an upper sleeve 89 which abuts the lower end of spline member 79 at its upper end and abuts another bearing shaft sleeve 90 at its lower end. The outer surface of sleeve 89 is spaced from the inner surface 41 of bearing pack housing 35 to define an annular passage 91 in which there are positioned a lubricant grease or oil and a pair of annular-shaped floating piston members 92 and 93, respectively. Piston member 92 comprises a piston body 94 with chevron-shaped seals 95 on one side and elastic compressible seals 96 on the other side. Seals 95 and 96 are compressed by end cap 97 held in place by a cap screw (not shown). The seals on piston member 92 are of well known design and include a central spacer member and end spacers which are compressed against the seals by end cap 97. Piston member 93 is constructed identically to piston member 92 and the detailed parts thereof are not separately identified. Piston members 92 and 93 have a sliding fit in the space between the inner surface 41 of bearing pack housing 35 and the outer surface of sleeve member 89 and have lubricant, grease or oil positioned between the piston members and in the space below piston member 93.

The bottom end of lubricant chamber 91 is defined by the upper surface of bearing shaft sleeve 90 and the upper end surface of housing upset ring spacer 98. At the lower end of lubricant chamber 91 there are provided a pair of openings closed by pipe plugs 99 and 100, which are used for filling the chamber 91 with lubricant.

The lower end of member 98 is enlarged and has a shoulder portion 101 which abuts the bevel or shoulder 42 on housing 35. The lower end of spacer 98 abuts the upper end of bearing housing spacer 102. Positioned below sleeve 90 and spacer 102 are a series of radial bearings and vertical thrust bearings which are sealed against lubricant leakage at the bottom of the drill by a radial seal.

The upper radial bearing consists of an outer ring 103 which supports a plurality of equally spaced roller bearing elements 104. A separate bearing ring 105 is positioned on bearing shaft 84 and completes the radial bearing assembly. A radial bearing of this design is adequate for a high speed turbo drill of the type disclosed herein. A suitable radial bearing for a 7¾ inch turbo drill is the MR-64 or MR-88 bearing manufactured by McGill Manufacturing Co., Inc., Valparaiso, Ind. 46383.

A bearing shaft sleeve 106 is positioned on bearing shaft 84 for rotation therewith and abuts the lower end of bearing ring 105 which is also fitted on bearing shaft 84 for rotation therewith. Ring member 107 is fitted tightly inside housing 35 and has sufficient clearance from sleeve 106 to permit rotation thereof. The upper end of ring 107 abuts the lower end of bearing ring 103 which is also tightly fitted in housing 35. The lower end of ring 107 is provided with a pair of grooves 108 in which there are positioned compression springs 109. Spring washer 110 fits against compression springs 109 and abuts the upper annular plate or bearing ring 111 of the uppermost vertical thrust bearing. The vertical thrust bearing consists of upper bearing ring 111, lower bearing ring 112, and a plurality of roller bearing elements 113 spaced equally around the bearing and secured in place by a bearing race (not shown). Upper bearing ring 111 fits tightly against housing 35 and has a clearance relative to sleeve 106. Lower bearing ring 112 has a fit on sleeve 106 and a clearance relative to the inner wall surface of housing 35.

A thrust bearing spacer ring 114 is fitted tightly on bearing shaft 84 and has a clearance relative to housing 35. The upper end of spacer 114 is provided with a pair of grooves 115 in which there are positioned compression springs 116 which press against lower ring 112. The lower end of spacer 114 abuts bearing shaft sleeve 117 and is provided with a pair of grooves 118 in which there are positioned compression springs 119. The lower end of spacer 114 also abuts the upper ring of the lower vertical thrust bearing.

The lower vertical thrust bearing consists of upper ring 120 which fits tightly on bearing shaft sleeve 117 and has a small clearance relative to the inner surface of housing 35. There is also provided a lower bearing ring 121 and a plurality of roller bearings equally spaced and secured in place by a bearing race (not shown). Lower bearing ring 121 fits tightly inside housing 35 and has a slight clearance relative to bearing shaft sleeve 117. Immediately below the bearing ring 121 is spring washer 123 which bears against compression springs 124 carried in grooves 125 in the upper end of ring member 126. Ring member 126 is the same as ring member 107, but, reversed in position.

Below ring member 126 and sleeve 117 there is positioned the intermediate radial thrust bearing. This bearing consists of outer bearing ring 127 which carries a plurality of roller bearing members 128 secured thereon for rotary movement. An inner ring 129 is secured on bearing shaft 84.

Below the intermediate radial bearing, there is positioned bearing housing spacer 130 which fits tightly within the bearing housing 35. There is also positioned bearing shaft upset spacer ring 131 which has a shoulder 132 which abuts against shoulder 133 on the bearing shaft. Space between spacers 130 and 131 is sufficient for passage of lubricant to the lower radial bearing.

Spacers 130 and 131 abut the upper end portions of the lower most radial bearing. This bearing consists of outer ring 134 which has a plurality of equally spaced roller bearing members 135 secured thereon and bearing ring 136. Outer ring 134 is tightly fitted inside housing 35 and inner bearing ring 136 is fitted on bearing shaft 84 for rotation therewith.

At the lower end of housing 35, bearing makeup sub 38 is tightened against the lower end of bearing ring 134 of the lower most radial bearings. On the bearing shaft 84, there is positioned bearing seal sleeve 137 which, at its upper end abuts the lower end of bearing ring 136 and at its lower end abuts bearing shaft end ring 138 which is fitted on shoulder 139 of the enlarged lower end 140 of the bearing shaft. Bearing makeup sub 138 is secured against separation of its threaded connection by cooperating grooves 20b and 21b enclosing lock ring 22b. Holes 23b provide for application of pressure for release of lock ring 22b. Sub 38 is also provided with a pheripheral groove 24b in which there is positioned an "O" ring seal 25b.

A dynamic radial seal is provided between sub 38 and seal sleeve 137 to prevent loss of lubricant from the bearings. The seal is a chevron-type seal having upper and lower backup rings 141 and 142, respectively. The middle portion of the seal is a spacer member 143. Above and below the spacer medium are positioned a plurality of chevron seals 144 which are maintained in compression to provide a seal against sub 38 and against sleeve 137 to prevent leakage of lubricant from the bearings during operation of the turbo drill. Upper spacer member 141 abuts a retaining ring 145 and is held in place thereby. The lower end of spacer ring 142 abuts compression spring 146 which is positioned in groove 147.

The lower enlarged end portion 140 of bearing shaft 84 is threaded internally as indicated at 148. This threaded opening receives and secures in place the hollow connector sub 149 of drill bit 150. The turbo drill is illustrated as driving a rotary-type drill bit 150. It should be understood, however, that any suitable drill bit could be used of the various types used with conventional drills utilizing various types of down hole motors. In particular, the turbo drill is particularly useful with solid head diamond bits as is illustrated in Fox U.S. Pat. No. 3,971,450.

OPERATION

Figure 6A:
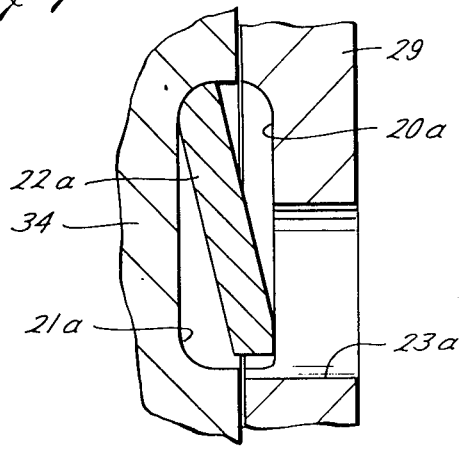
FIG. 6A is an enlarged detail sectional view of one of the locking rings illustrated in FIG. 6.
Figure 7A:
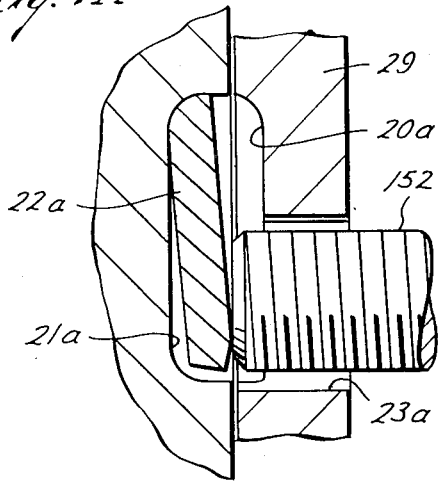
FIG. 7A is an enlarged detailed sectional view showing the relationship of the release mechanism to the locking ring of 6A.
Figure 6B:
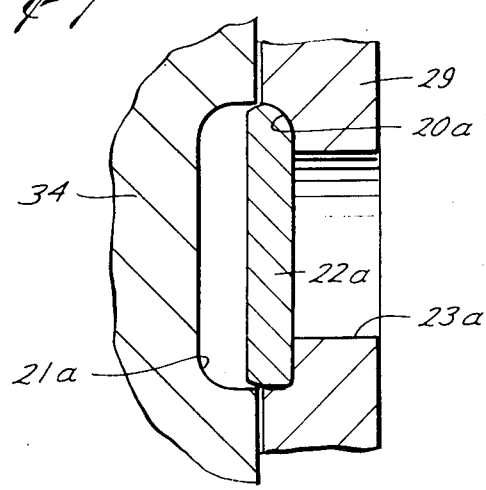
FIG. 6B is an enlarged view of another embodiment of locking ring similar to that illustrated in FIG. 6A.
Figure 7B:
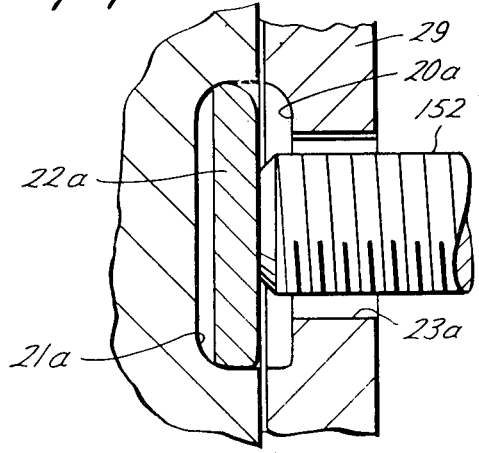
FIG. 7B is an enlarged detail sectional view showing the relationship of the release mechanism to the locking ring of FIG. 6B.

The turbo drill is assembled as illustrated in FIGS. 1A, 1B, 1C, and 1D. The housing is in several sections, as described above, and is threadly connected at several points. Since the turbo drill housing is held stationary and the drill is driven at high speed there are substantial torques placed upon the threaded joints which tend to cause those joints to unscrew. In the past, threaded joints have been protected against unscrewing by use of set screws. However, set screws sometimes come loose themselves and the desired protection for the threaded joint may not be obtained. In this construction, the threaded joints are protected by a lock ring arrangement which is shown in use for several threaded connections. In FIG. 6, the lock ring arrangement is shown in considerable detail. In FIG. 6 it is seen that the lock ring 22a has a normal expanded condition. When threaded connection 33 is made, the housing 29 slides past lock ring 22a until grooves 20a and 21a reach a mating relation, at which point, lock ring 22a springs into the position indicated locking the parts together to prevent separation of the thread. In FIG. 7 an apparatus is illustrated for releasing the lock ring to permit the threaded joint to be unscrewed. The apparatus consists of ring member 151 having a plurality of screws 152 around the periphery thereof. The screws 152 are adjusted to enter holes 23a at uniformly spaced points around the housing 29 and press uniformly against lock ring 22a until it is compressed to point where it clears the edge of groove 20a and permits the threaded joint to be separated. FIG. 6B illustrates the identical arrangement but uses a lock ring 20a which is a straight spring member instead of an annularly deflected spring as in FIG. 6A. The operation is otherwise identical.

During assembly of the apparatus a suitable lubricant grease or oil, which will withstand the temperatures normally encountered by the turbo drill, is introduced through the lower opening 100, after unplugging the same, to fill the lower portion of the turbo drill with lubricant. The lubricant introduced through opening 100 fills and completely surrounds the bearings and the radial seals. Lubricant is also introduced through opening 99, after unplugging the same, to fill the space above piston 93 (as shown in dotted lines) and cause piston 92 (as shown in dotted lines) to rise above it. Sufficient lubricant is introduce to cause the pistons to be positioned substantially as shown in full line in FIGS. 1B and 1C. The holes 99 and 100 are plugged to prevent loss of lubricant.

When the turbo drill is connected to drill string 14 as shown in FIG. 1A, drilling mud is pumped through the drill string at a high rate of flow and through the turbo drill. The drilling mud flows through passage 15 into the annular space at the upper end of the turbine section. The drilling mud flows through each of the turbine stages causing the turbine to rotate at a high speed. The drilling mud flows past each of the vanes 27 of the stator members 26 and is directed from those vanes at a high viscosity against vanes 49 of rotor members 48. The shape of the vanes of the stator and rotor members has been discussed fully in connection with the description of the assembled apparatus. The shape of the vanes particularly the exit angle, is designed to create a maximum thrust on the rotor members and a maximum torque on the rotor shaft 44 as the drilling mud is pumped through the turbine section. As indicated above, a large number of turbine elements make up the turbine section. In a typical 7 ¾ inch turbo drill, there are 50 sets of stator members and 50 sets of rotor members, which results in the production of a high torque and a high speed of turning of the rotor shaft 44.

The rotor shaft 44 which is turning at a high rate of speed is connected by a splined connection, as described above, to bearing shaft 84. The drilling mud flows from the turbine section through the annular space around the splined connection and through the passage in the middle of the splined connection into the hollow passage 88 extending through the bearing shaft to the exterior of the drill where the mud is discharged through the drill bit (whether a rotary bit or a solid head bit) and then flows back up the hole being drill to remove cuttings from the hole. The drill mud flows at least partly around the splined connection at the top of the bearing shaft and applies a hydraulic force against the upper end of piston 92. The piston 92 is therefore maintained under a high hydrostatic pressure of drilling mud which is flowing through the turbo drill. The pressure on piston 92 presses against the lubricant in the space 91 and applies pressure through piston 93 to maintain the lubricant in the space below the piston 93 and lubricant around the bearings and radial seal under a substantial hydrostatic pressure. In the past, floating pistons have been used to pressurize lubricant systems in turbo drills. However, drilling mud has eventually eroded the pistons and penetrated into the bearing and sealing areas which resulted in the destruction of the working parts of the turbo drill. In this construction, the double piston arrangement with lubricant providing a hydraulic fluid between the pistons protects the lower piston against contamination by the drilling mud and provides protection and greater life for the seal.

In the operation of the turbo drill, the design of bearings and of seals is of critical importance. The bearings and the seals in prior art turbo drills are the points where the highest incidence of failure has occurred. The radial bearings are not a major problem in that the radial loads are much smaller than the thrust loads and the space constraints are not so great as on the radial bearings. As described above, roller-type radial bearings are used herein, McGill MR-64 and MR-88 bearings being a preferred type.

In this turbo drill the thrust bearings are an important feature of construction. There are two sets of thrust bearings used. The upper thrust bearings carry the upper thrust produced during drilling. The lower thrust bearings carry produced when the motor is rotated off bottom and in an alternate embodiment of the invention carry the operating thrust after the upper bearings have worn out. This embodiment is to be described in connection with FIG. 8 of the drawings. The preferred thrust bearings described above are roller-type thrust bearings supported between two annular plates or rings. A suitable thrust bearing, which is used in this apparatus, is the ATH734 roller thrust bearing manufactured by Andrews Bearing Corporation, Spartanburg, S.C. 29304. This bearing will carry a dynamic load of 122,000 pounds.

As noted above, the seals in the bearing section and the lubrication system are of substantial importance. The bearings in prior art turbo drills have had very short lives because they operated under direct exposure to the drilling mud. In this improved turbo drill, the entire bearing section is operated with a sealed lubrication system where the oil or grease is pressurized by floating pistons as previously described. The seals which prevent the loss of lubricant from the bearing section are most important. The prior art drills which have attempted to use sealed lubricant systems have generally used packing type seals or compressed rubber seals which in many cases apply such high forces to the bearing shaft as to make it difficult to rotate. In this improved turbo drill, the rotary seal for the bearings is a multiple chevron-type seal which prevents loss of lubricant, prevents intrusion of drilling mud to the bearings, thus, increasing substantially the life of the bearings and of the drill. The double piston arrangement not only protects the lower piston but also provides lubricant for the bearings after the lower piston reaches its bottom position, as the lubricant between the pistons then leaks past the lower piston.

AN ALTERNATE EMBODIMENT

In the operation of a turbo drill, when the upper thrust bearings, which carry the load during drilling, are worn out or damaged and fail to function, it has previously been necessary to remove the drill from the hole and repair the bearings before the turbo drill can continue to function. Because of the very high cost per hour of operating a drill, trips to the surface for repair or service are to be avoided or delayed as long as possible. In FIG. 8, there is illustrated an alternate embodiment of the invention in which it is possible to operate the turbo drill during drilling operation utilizing the lower thrust bearings are worn out or become damaged.

In FIG. 8 there is shown a detail view in the area of the joint between the stator housing sub and the stator housing. The cap member 66 on rotor shaft 44 has a tubular sleeve 153 secured thereon as by welding or the like. Sleeve 153 has an upper surface 154 which is beveled to provide a valve seat which is normally opened. In the side walls of sleeve 153 are a plurality of enlarged holes or apertures 155.

During normal operation of the turbo drill, the mud flows through the drill as described above, except that in this portion of the drill, the mud is flowing through and around sleeve 153 before it enters the annular space around the rotor shaft.

When the upper thrust bearings have been damaged or worn out, as indicated by difficulty in operation of the turbo drill, a ball 156 of steel or, other suitable material, is dropped through the drill string and seats on the beveled surface 154. When this occurs, the drilling mud can no longer flow through sleeve 153 but must flow only around it. The flow passage for the drilling mud is therefore substantially reduced which creates a higher back pressure in the inlet portion of the turbo drill. This higher hydrostatic back pressure of drilling mud tends to force the housing upward slightly relative to the rotor and bearing shafts and the drill so that the drill acts as if it is running off bottom. Under this higher hydrostatic drilling mud pressure the lower thrust bearings carry the thrust load of the drilling operation. The rotor shaft, bearing shaft, and drill bit can therefore continue to rotate with the lower thrust bearings carrying the entire thrust in a vertical direction. This allows the drilling to continue using the lower thrust bearings without necessitating a trip to the surface for the drill for repair of the bearings. The drilling operation can therefore continue until the lower thrust bearings are damaged or worn out before it is necessary to bring the drill to the surface for service or repair.

ANOTHER EMBODIMENT OF THE INVENTION

Figure 9:
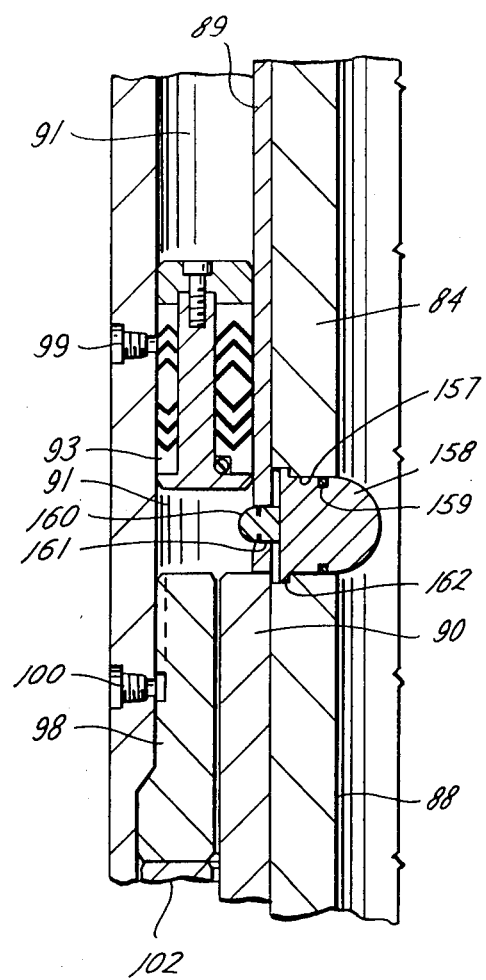
FIG. 9 is an enlarged detail sectional view, taken in vertical section, of the middle portion of FIG. 1C, illustrating an optional feature providing for indication of loss of lubrication in the turbo drill.

In FIG. 9, there is illustrated still another embodiment of the invention which provides, as an optional feature, a means for indicating the loss of lubricant. In FIG. 9, there is illustrated a modification of the rotor at the base of the lubricant passage 91 below piston 93. In this embodiment, rotor shaft 84 is provided with a hole or aperture 157 which opens into the longitudinal interior passage 88. A plug member 158 fits in aperture 157 and extends partly into passage 88. Plug member 158 is provided with an "O" ring seal 159 to prevent loss of lubricant. Plug member 159 is provided with an abutment 160 which extends through a hole or aperture 161 in sleeve 89.

In this embodiment, when the lubricant has gradually leaked from the seal lubricant system, piston 93 gradually drops with the fall in lubricant level. In FIG. 9, piston 93 has reached a position where it is almost ready to contact abutment 160 on plug member 158. As further lubricant is lost from the system piston 93, under pressure of drilling mud above, will move to a point where it engages abutment 160 and forces the same outward. The force supplied is sufficient to break the flange 162 on plug 158 and force the plug into the passage 88 in the rotor shaft 84. Plug 158 temporarily interferes with the flow of drilling mud through the turbo drill. This is registered on the surface by detection of a very sudden surge in drilling mud back pressure. This surge in back pressure indicates that there is an obstruction in the turbo drill.

The plug 158 is formed of a friable material which will create the desired obstruction in the drill but which will disintegrate within a relatively short time as the drilling mud flows past it. The sudden upsurge in back pressure of drilling mud followed by a return of the pressure to normal gives an indication that the indicator plug has been dislodged and that the lubricant is substantially gone from the sealed lubrication system. At this point in operation, the turbo drill can be operated only for a short time and then must be removed to the surface for introduction of more lubricant.

While this invention has been described fully and completely with special emphasis upon several preferred embodiments, it should be understood that other equivalent means of carrying out the inventive features may be utilized without departing from the scope and intent of coverage of this invention. It should also be noted that while the device described, as a whole, is a turbo drill, there are certain of the novel features which may have broader application. Thus, the improved blade or vane design in the turbines (rotor and stator) is peculiarly adaptable to turbo drills. The improved bearings and seal design, however, is applicable to other types of down hole drilling motors, e.g., positive displacement motors and the like. The thread locking mechanism, and device for removing the same, is of general application and may be utilized for locking threads in other devices than turbo drills. The arrangement for reversal of operation of the thrust bearings may be used in other types of down hole motors, such as positive displacement motors, for driving rotary earth drills. The twin piston arrangement for the sealed lubrication and the alternate feature of the plug member for indicating loss of lubricant from the sealed system are each applicable to other rotary down hole drilling motors and are not restricted to turbo drills. While this apparatus has been described with a vertical orientation, it is to be understood that it may be and is used in other positions. The term "vertical," therefore, is intended to mean "longitudinal" or "axial" of the turbo drill.

We claim:

1. A downhole well drilling tool adapted for connection at one end to the lower end of a drill string and at the other end to a drill bit to be driven thereby, the drilling tool comprising tubular housing means and rotary shaft means supported therein and extending therefrom and adapted to support a drill bit, motor means in said housing means actuated by flow of drilling fluid therethrough and operable to rotate said shaft means, bearing means in said housing means comprising a plurality of bearing members spaced longitudinally of and supporting said rotary shaft means against radial and longitudinal thrust loads, lubricant fluid filling the space between said housing means and said shaft around said bearing means and for a predetermined distance above the uppermost of said bearing members, piston means sealing the space between said shaft means and said housing means above said lubricant fluid and moveable longitudinally of said housing means, said piston means being operable by pressure of drilling fluid to maintain said lubricant fluid under pressure to lubricate said bearing means, rotary sealing means positioned above and spaced from said piston means to prevent contact of drilling fluid therewith, and hydraulic means applying pressure from drilling fluid above said sealing means to said piston means.

2. A downhole well drilling tool according to claim 1 in which rotary seal means is positioned between said shaft means and said housing means below the lowermost of said bearing members, to restrict the loss of lubricant fluid therefrom.

3. A downhole well drilling tool according to claim 1 in which said hydraulic means is a layer of lubricant fluid overlying said piston means, and said rotary sealing means above said piston means is a second piston means supported on said last named layer of lubricant fluid.

4. A downhole well drilling tool in accordance with claim 1 in which rotary seal means is positioned between said shaft means and said housing means below the lowermost of said bearing members to restrict the loss of lubricant fluid therefrom, said hydraulic means is a layer of lubricant fluid overlying said piston means, and said rotary sealing means above said piston means is a second piston means supported on said last named layer of lubricant fluid.

5. A down hole well drilling tool according to claim 4 in which each of said piston means is a piston supported on a layer of lubricant fluid and having seals engaging the outside of bearing shaft means and the inside of said housing means to function as a rotary seal.

6. A downhole well drilling tool according to claim 5 in which said housing means is provided with vertically spaced apertures adjacent to the upper end of the uppermost of said bearing members for introduction of lubricant fluid separately into the space between the lower piston and said bearing means and the space between said pistons.

7. A turbo drill adapted for connection at one end to the lower end of a drill string and at the other end to a drill bit to be driven thereby, said turbo drill comprising a tubular housing having an upper stator portion and a lower bearing portion, a stator comprising a plurality of fixed turbine blades in said stator portion, a rotor shaft extending through said stator portion rotatably supported therein, a plurality of rotor blades fixed on said rotor shaft and cooperable with said stator blades to direct the flow of drilling fluid through said turbo drill to rotate said rotor shaft, a bearing shaft operatively connected to said rotor shaft at its upper end adapted to support a drill bit at its lower end, a plurality of bearings supported in said housing bearing portion and on said bearing shaft and spaced longitudinally thereof supporting said bearing shaft for rotation and providing support for thrust in both radial and vertical directions, a rotary seal positioned below the lowermost of said bearings between said bearing shaft and housing to retain lubricant on said bearings, lubricant fluid in the annular space around said bearing shaft extending from said rotary seal to a predetermined level above said bearings, a piston positioned at the upper level of lubricant providing a rotary seal between said bearing shaft and housing and operable by pressure of drilling fluid flowing through said turbo drill to apply pressure to said lubricant, said piston being moveable longitudinally of said housing with changes in lubricant level, rotary sealing means positioned above and spaced from said piston to prevent contact of drilling fluid therewith, and hydraulic means applying pressure from drilling fluid above said sealing means to said piston means.

8. A turbo drill according to claim 7 in which said hydraulic means is a layer of lubricant fluid overlying said piston and said rotary sealing means above said piston is a second piston supported on said last named layer of lubricant fluid.

9. A bearing pack for a downhole well drilling tool comprising a housing to be connected to the housing of a well drilling fluid actuated downhole motor, a rotary bearing shaft positioned in said bearing housing having one end adapted to support a drill bit and another end adapted to be driven by the rotary shaft of a well drilling fluid actuated downhole motor when assembled thereon, bearing means in said bearing housing comprising a plurality of bearing members spaced longitudinally of and supporting said bearing shaft against radial and longitudinal thrust loads, rotary seal means positioned below the lowermost of said bearing members in said bearing housing, lubricant fluid filling the space around said bearing shaft from the level of said rotary seal means to a predetermined level above the uppermost of said bearing members, piston means sealing the space between said bearing and shaft at the upper surface of said lubricant fluid and adapted to be actuated by drilling fluid pressure to maintain said lubricant fluid under pressure to lubricate said bearning means, rotary sealing means positioned above and spaced from said piston means to prevent contact of drilling fluid therewith, and hydraulic means applying pressure from drilling fluid above said sealing means to said piston means.

10. A bearing pack for a down hole well drilling tool according to claim 9 in which said hydraulic means ia a layer of lubricant fluid overlying said piston means and said rotary sealing means is a second piston means supported on said last named layer of lubricant fluid.

* * * * *